(12) United States Patent
Dickinson

(10) Patent No.: US 8,176,407 B2
(45) Date of Patent: May 8, 2012

(54) COMPARING VALUES OF A BOUNDED DOMAIN

(75) Inventor: Grant Dickinson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/715,402

(22) Filed: Mar. 2, 2010

(65) Prior Publication Data

US 2011/0219289 A1    Sep. 8, 2011

(51) Int. Cl.
G06F 7/02 (2006.01)

(52) U.S. Cl. ......................... 714/819; 707/780

(58) Field of Classification Search .................. 707/204, 707/101, 2, 780; 715/501.1; 714/819
See application file for complete search history.

(56) References Cited

U.S. PATENT DOCUMENTS

| | | | |
|---|---|---|---|
| 6,636,850 B2 * | 10/2003 | Lepien | 707/780 |
| 6,892,348 B1 | 5/2005 | Truelove et al. | |
| 6,961,721 B2 * | 11/2005 | Chaudhuri et al. | 1/1 |
| 7,117,502 B1 | 10/2006 | Harris | |
| 7,287,019 B2 | 10/2007 | Kapoor et al. | |
| 7,287,131 B1 | 10/2007 | Martin et al. | |
| 7,296,011 B2 | 11/2007 | Chaudhuri et al. | |
| 7,325,013 B2 | 1/2008 | Caruso | |
| 7,451,146 B2 | 11/2008 | Boehm | |
| 7,870,151 B2 * | 1/2011 | Mayer et al. | 707/780 |
| 2002/0124015 A1 * | 9/2002 | Cardno et al. | 707/204 |
| 2004/0153469 A1 * | 8/2004 | Keith-Hill | 707/101 |
| 2004/0249789 A1 * | 12/2004 | Kapoor et al. | 707/2 |
| 2005/0060643 A1 * | 3/2005 | Glass et al. | 715/501.1 |
| 2008/0189279 A1 | 8/2008 | Mayer et al. | |
| 2008/0313111 A1 | 12/2008 | Padovitz et al. | |
| 2009/0037498 A1 | 2/2009 | Mukherjee et al. | |

OTHER PUBLICATIONS

Fraser, Neil, "Fuzzy Patch", Retrieved at <<http://neil.fraser.name/writing/patch/>>, May 2006, pp. 8.

Han, et al. , "Implementation and Performance Evaluation of Fuzzy File Block Matching", Retrieved at <<http://www.usenix.net/events/usenix07/tech/full_papers/han/han.pdf>>, 2007 USENIX Annual Technical Conference, pp. 199-204.

* cited by examiner

*Primary Examiner* — David Ton
(74) *Attorney, Agent, or Firm* — Toler Law Group, PC

(57) ABSTRACT

Methods, systems, and computer-readable media to compare values of a bounded domain are disclosed. A particular method includes, for each value in a bounded domain, determining a corresponding set of allowable errors associated with the value. The sets of allowable errors are stored at a memory. The method includes determining a comparison score between a first value of the bounded domain and a second value of the bounded domain based on a comparison of a first set of allowable errors corresponding to the first value and a second set of allowable errors corresponding to the second value.

20 Claims, 6 Drawing Sheets

COMPARING VALUES OF A BOUNDED DOMAIN

BACKGROUND

Fuzzy matching algorithms are often used to identify duplicate data stored in computer systems. An example of duplicate data may be multiple records stored at a database system for the same person (e.g., one of the records may have a misspelled name). Data duplication may lead to wasted computing resources (e.g., storage resources). The matching algorithms are called "fuzzy" because they deal with inexact (i.e., "fuzzy") comparisons of data. Fuzzy matching algorithms may be time-intensive and resource-intensive due to the processing of various "fuzzy match candidate" permutations for each data item to be matched. For example, current fuzzy matching algorithms for strings exponentially increase in computational complexity (e.g., $O(N^2)$) with respect to the length of the string being examined.

SUMMARY

A fuzzy matching method to compare two values of a bounded domain is disclosed. A set of allowable errors is pre-computed and stored for each value of a bounded domain. By way of example, and not limitation, bounded domains may include finite numeric domains, date domains, color spectrum domains, list domains, or enumerated set domains. Furthermore, by way of example, and not limitation, allowable errors may include typographical errors, range errors, transposition errors, transliteration errors, or other types of errors. Fuzzy matching of two values in the bounded domain is accomplished using a method with reduced complexity by comparing the set of allowable errors for each of the two values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems, methods, and computer-readable media to compare values of a bounded domain are disclosed. In a particular embodiment, a computer-implemented method includes, for each value in a bounded domain, determining a corresponding set of allowable errors associated with the value. The method also includes storing the sets of allowable errors at a memory. The method further includes determining a comparison score between a first value of the bounded domain and a second value of the bounded domain based on a comparison of a first set of allowable errors corresponding to the first value and a second set of allowable errors corresponding to the second value.

In another particular embodiment, a computer system includes a processor and a memory coupled to the processor. The memory stores instructions that when executed by the processor, cause execution of fuzzy matching logic that includes a computation component and a run-time comparison component. The computation component is configured to, for each of a plurality of values in a bounded domain, determine a set of allowable errors for the value and to store the set of allowable errors at the memory. The run-time comparison component is configured to determine a comparison score between a first value and a second value in the bounded domain based on a first set of allowable errors corresponding to the first value and a second set of allowable errors corresponding to the second value.

In another particular embodiment, a computer-readable medium includes instructions, that when executed by a computer, cause the computer to, for each value in a bounded domain, determine a corresponding set of allowable errors associated with the value. The instructions also cause the computer to performing a hashing operation on the sets of allowable errors. Performing the hashing operation on a particular set of allowable errors results in a bitmask that is representative of the particular set and a count of logical true bits of the bitmask. The instructions further cause the computer to store the bitmasks and counts in a statically allocated portion of memory. The instructions cause the computer to receive a first value within the bounded domain and a second value within the bounded domain. The instructions also cause the computer to retrieve a first bitmask and a first count corresponding to the first value and a second bitmask and a second count corresponding to the second value from the memory. The instructions further cause the computer to determine a Jaccard score of the first bitmask and the second bitmask.

Figure 1:
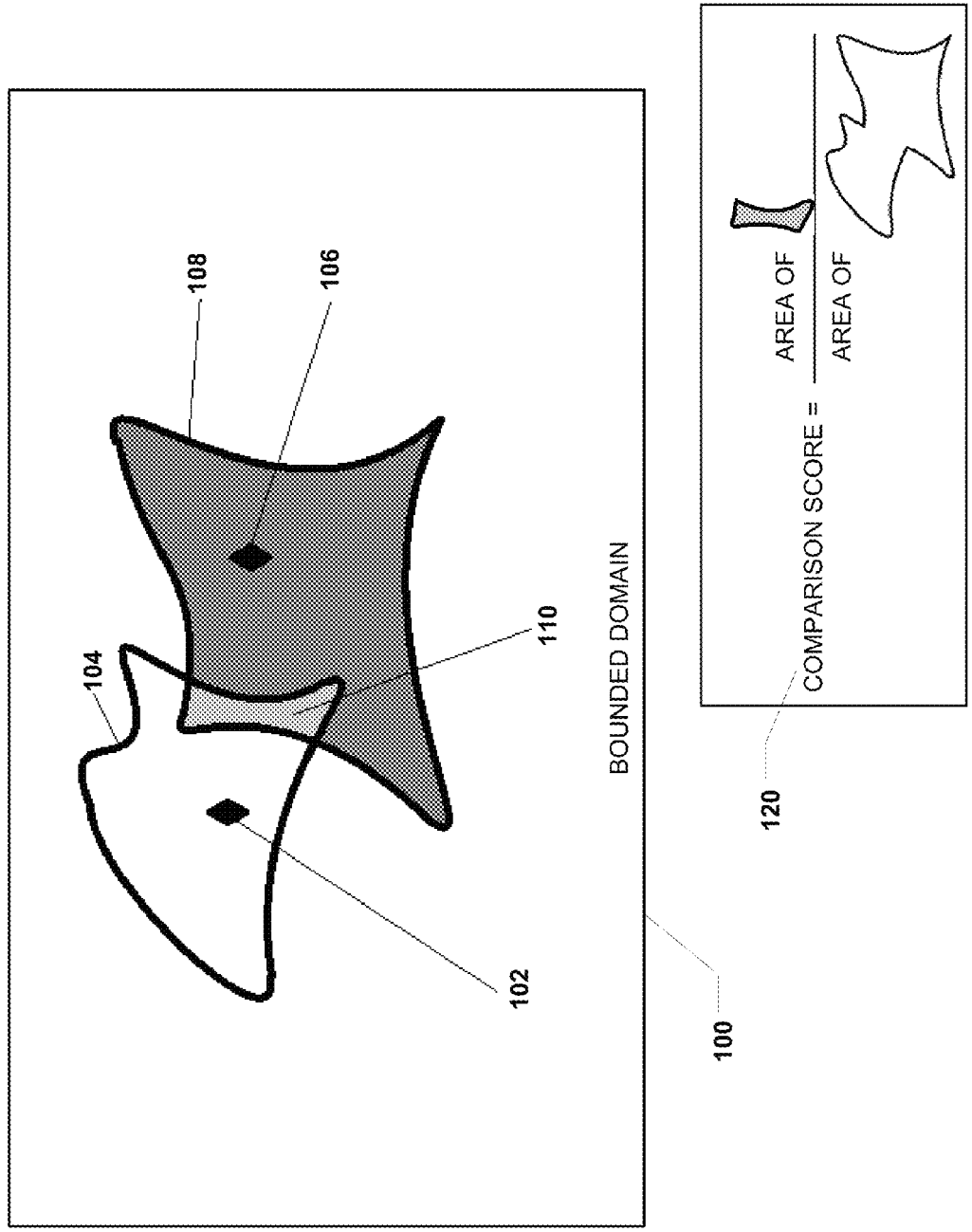
FIG. 1 is a diagram to illustrate a particular embodiment of comparing two values of a bounded domain.

FIG. 1 depicts a particular embodiment of comparing two values of a bounded domain 100. The bounded domain 100 may include a plurality of values (e.g., illustrative values 102 and 106). Each value in the bounded domain 100 may have an associated "fuzzy boundary." For example, in the particular embodiment illustrated in FIG. 1, the first value 102 has a first fuzzy boundary 104 and the second value 106 has a second fuzzy boundary 108.

When the fuzzy boundaries of two values overlap, the two values may be said to be "fuzzy similar," (e.g., treated as matching for the purposes of consolidating duplicate values). Furthermore, an amount of similarity between the two values may be quantified based on a size of overlap between the fuzzy boundaries. For example, in the particular embodiment illustrated in FIG. 1, the values 102 and 106 may be fuzzy similar because the fuzzy boundaries 104 and 108 intersect to form an intersection 110.

In a particular embodiment, a comparison score 120 (e.g., Jaccard score) representing the amount of similarity between the two values 102 and 106 may be determined by dividing the area of the intersection 110 of the two fuzzy boundaries 104 and 108 by the area of a union of the two fuzzy boundaries 104 and 108. It should be noted that because the bounded domain 100 is bounded, fuzzy boundaries for each value of the bounded domain may be pre-computed and stored. It will thus be appreciated that when the fuzzy boundaries are pre-computed and stored, a comparison score between two values in the bounded domain 100 may be computed in constant time (i.e., O(1)).

Figure 2:
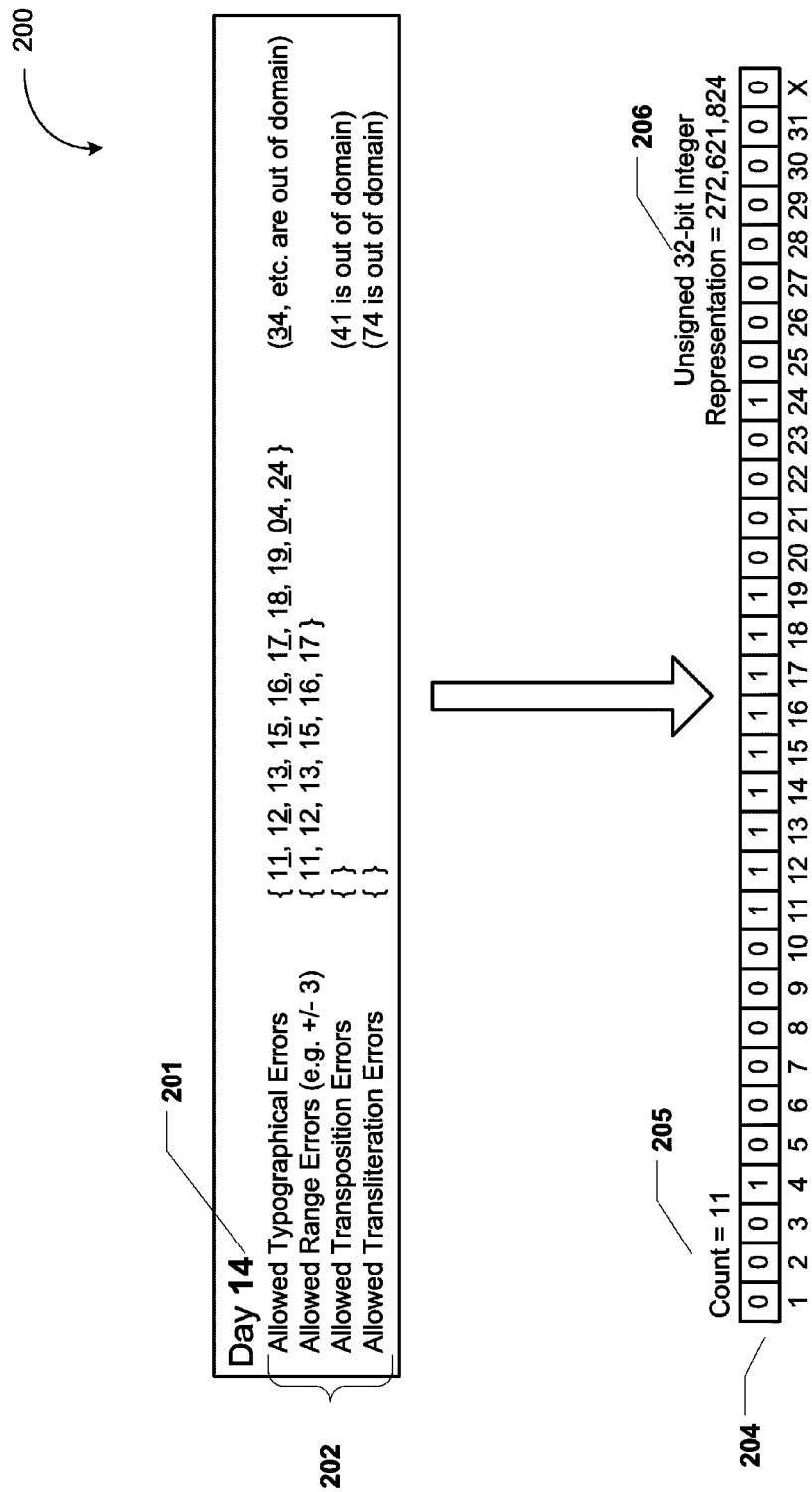
FIG. 2 is a diagram to illustrate a particular embodiment of a set of allowable errors for a value of a bounded domain.

FIG. 2 depicts a particular embodiment of a set of allowable errors for a value of a bounded domain and is generally designated 200. For example, the domain of dates may be considered a bounded domain because there may be a known first date of the domain (e.g., January 1st of year zero) and a known last date of the domain (e.g., a current date). A date may be divided into three subdomains: month, day, and year. The month subdomain may be a finite numeric domain that includes twelve values (e.g., 1 to 12, where 1 represents January and 12 represents December). The day subdomain may be a finite numeric domain that includes thirty-one values (e.g., 1 to 31). The year subdomain may be a finite numeric domain that includes a number of values corresponding to a current year (e.g., if the current year is 2010, the year subdomain may include 2011 values: 0 to 2010). In a particular embodiment, the year subdomain may be represented by ngrams. For example, the year 2010 may be represented by three bigrams "20," "01," and "10," and the year subdomain may thus include one hundred bigram values (e.g., 00-99).

To perform fuzzy matching on values of a bounded domain (e.g., fuzzy matching of two dates), a set of allowable errors may first be determined for each value in the bounded domain. For example, FIG. 2 illustrates a particular embodiment of determining a set 202 of allowable errors for a particular value 201 "Day 14" (e.g., the fourteenth day). Allowable errors may include typographical errors, range errors, transposition errors, transliterations, and any other type of error.

In a particular embodiment, the allowed typographical errors for a particular value include variations of the particular value that differ by one character. For example, a set of allowable typographical errors for the value "Day 14," at 201, may include the following variations of the string "14": "11," "12," "13," "15," "16," "17," "18," "19," "04," and "24." In a particular embodiment, allowable errors that are outside the bounded domain may be ignored. That is, each allowable error in a set of allowable errors may be within the bounded domain. For example, the typographical variation "34" may be ignored because the day domain only includes the strings "01" to "31."

In a particular embodiment, the allowed range errors for a particular value include variations of the particular value that are within a particular range of difference. For example, when the range of difference is +/−3, a set of allowable range errors for the value "Day 14," at 201, may include "11," "12," "13," "15," "16," and "17."

In a particular embodiment, the allowed transposition errors for a particular value include variations of the particular value that have two characters in transposed positions. For example, the value "Day 21" may have an allowed transposition error of "12." It should be noted that the set of allowed transposition errors for the value "Day 14" may be an empty set because the transpose "41" of the value "14" is outside the bounded domain of days.

In a particular embodiment, the allowed transliteration errors for a particular value include data entry errors and data recognition errors associated with the particular value. For example, when data recognition is performed on handwritten numerals, the data recognition may confuse certain pairs of numbers that look similar (e.g., 1 and 7, 5 and 6, 6 and 8, 7 and 9, 8 and 9). Thus, "17" may be an allowed transliteration error for the value "11" and "29" may be an allowed transliteration error for the value "28." It should be noted that the set of allowed transliteration errors for the value "Day 14" may be an empty set because "71" is outside the bounded domain of days.

In a particular embodiment, a set of allowable errors for a particular value may also include knowledge-based errors. For example, it may be known that the string "00" is commonly used to represent the value "Year 2000." In another particular embodiment, when a value of a bounded domain is separated into ngrams, determining a set of allowable errors for the value includes determining the set of allowable errors for each of the plurality of ngrams. For example, if the year 2010 is separated into three bigrams "20," "01," and "10," determining a set of allowable errors for the year 2010 may include determining a set of allowable errors for each of the bigrams "20," "01," and "10."

After sets of allowable errors are determined for each value of a bounded domain, the sets of allowable errors may be stored at a memory (e.g., random access memory (RAM) or disk-based storage). For example, the sets of allowable errors may be stored as constants at a software program that includes fuzzy matching logic as part of a user interface, a word processing application, a spreadsheet application, a database application, or a dynamically linked library (DLL). For example, the fuzzy matching logic may be provided as a function that may be called by one or more of the user interface, the word processing application, the spreadsheet application, and the database application. As another example, the fuzzy matching logic may be provided as a function that is included in the DLL and that may be called by applications that link against the DLL. Alternately, the sets of allowable errors may be stored as immutable data at a computer system or shared storage device (e.g., network accessible storage).

In a particular embodiment, each particular set of allowable errors is converted into a bitmask that is representative of the particular set of allowable errors via a hashing operation. For example, the set 202 of allowable errors may be converted into a bitmask 204. Each bit of the bitmask 204 may be a logical true value (e.g., "1") or a logical false value (e.g., "0") depending on whether an allowable error corresponding to the bit is in the set 202 of allowable errors. For example, the bits representing "04," "11"-"19," and "24" are marked as logical true (e.g., "1") in the bitmask 204. Storing the set 202 of allowable errors for the value "Day 14," at 201, may include storing the bitmask 204.

In a particular embodiment, the number of logical true values (e.g., "1"s) in a bitmask are stored along with the bitmask. For example, a count of "11," at 205, may be stored with the bitmask 204 because the bitmask 204 includes eleven "1"s. In another particular embodiment, the bitmask may be represented by a data type. By way of example, and not limitation, the data type may be a 32-bit unsigned integer, a 64-bit unsigned integer, a 128-bit unsigned integer, a globally unique identifier (GUID), or some other data type. For example, the bitmask 204 may be represented by an unsigned 32-bit integer "272,621,824," at 206.

It will be appreciated that a set of allowable errors may be represented with a native computer data type (e.g., unsigned integer). Thus, the allowable errors for an entire bounded domain may be stored in a two-dimensional array that associates each particular value of the bounded domain with a corresponding set of allowable errors. It will also be appreciated that allowable errors may be pre-computed in linear time (e.g., O(N)) with respect to the size of the bounded domain.

It should be noted that although the illustrated embodiments have been described with reference to dates, comparing values of a bounded domain as described herein may be performed with respect to any bounded domain. For example, bounded domains may include, but are not limited to, finite numeric domains (e.g., human ages, product sizes, etc.), date domains, finite color spectrum domains (e.g., RGB values), list domains, and enumerated set domains (e.g., in software applications). Bounded domains may be ordered or unordered. For example, a domain of product sizes (e.g., small, medium, and large) may be considered an ordered domain. On the other hand, the domain of RGB color values may be considered unordered.

Figure 3:
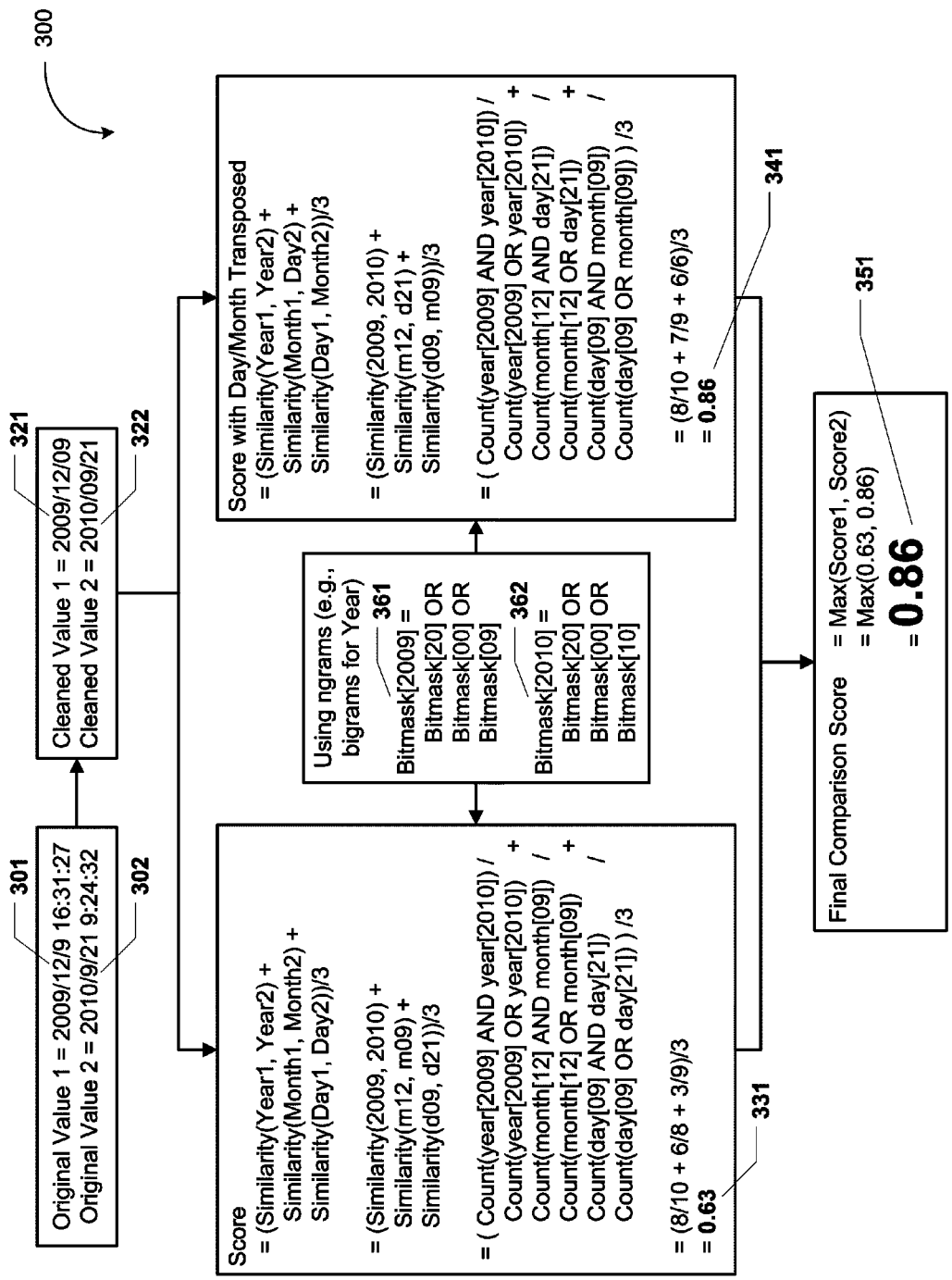
FIG. 3 is a diagram to illustrate a particular embodiment of determining a comparison score between two values of a bounded domain.

FIG. 3 depicts a particular embodiment of a method 300 of determining a comparison score between two values of a bounded domain. For example, in the particular embodiment illustrated in FIG. 3, a first value "2009/12/9 16:31:27," at 301, and a second value "2010/9/21 9:24:32," at 302, may be received (e.g., from a user or from an application calling a function configured to perform the method 300) and compared. It should be noted that the specific scores and values depicted in FIG. 3 are examples and presented for illustrative purposes only.

In a particular embodiment, the values to be compared are cleaned (e.g., normalized) prior to comparison. For example, the first value 301 and the second value 302 may be stripped of time information and zero padded, resulting in a first cleaned value "2009/12/09," at 321, and a second cleaned value "2010/09/21," at 322.

Because months and days are commonly transposed in certain parts of the world (e.g. YYYY/MM/DD vs. YYYY/DD/MM), two comparison scores 331 and 341 may be obtained for the cleaned values 321 and 322.

A first comparison score 331 may be determined as an average of three similarity scores: a day similarity score, a month similarity score, and a year similarity score. For example, determining a day similarity score for the day "09" of the first cleaned value 321 and the day "21" of the second cleaned value 322 may include retrieving a first bitmask and a first count corresponding to "09" from memory, retrieving a second bitmask and a second count corresponding to "21" from memory, and determining a similarity score between the first bitmask and the second bitmask. In a particular embodiment, a similarity score between bitmasks is computed as a Jaccard score (e.g., a size of a bitmask intersection divided by a size of a bitmask union). When counts are stored along with bitmasks, a Jaccard score may be determined by calculating a logical intersection of the first and second bitmasks, counting the number of logical true bits (e.g., "1"s) in the logical intersection as a third count, calculating a logical union of the first and second bitmasks, counting the number of logical true bits (e.g., "1"s) in the logical union as a fourth count, and computing the Jaccard score as a quotient of the third count and the fourth count. In a particular embodiment, the fourth count may be determined by subtracting the third count from a sum of the first count and the second count, in accordance with the mathematical property Count(A union B)=Count(A)+Count(B)−Count(A intersection B).

A month similarity score for the month "12" of the first cleaned value 321 and the month "09" of the second cleaned value 322 may be determined as described with reference to the day similarity score. A year similarity score may also be determined as described with reference to the day similarity score. Alternately, when year values are separated into ngrams (e.g., bigrams), the bitmask corresponding to a particular year may be computed by performing a logical OR operation on the bitmasks corresponding to each of the ngrams of the particular year. The count corresponding to the year may be determined by counting the logical true bits (e.g., "1"s) in the result of the logical OR operation. For example, a first bitmask 361 for the year "2009" of the first cleaned value 321 may be determined by performing a logical OR operation on bitmasks for the bigrams "20," "00," and "09." Similarly, a second bitmask 362 for the year "2010" of the second cleaned value 322 may be determined by performing a logical OR operation on bitmasks for the bigrams "20," "01," and "10."

After the day similarity score, the month similarity score, and the year similarity score are determined, the first comparison score 331 may be calculated as the average of the three. For example, in the particular embodiment illustrated in FIG. 3, the first comparison score 331 of 0.63 is an average of a first year similarity score of 0.8, a first month similarity score of 0.75, and a first day similarity score of 0.33.

The second comparison score 341 may be determined as described above with reference to the first comparison score 331, except that the day and month of one of the cleaned values 321-322 may be transposed. For example, transposing the day and month of one of the cleaned values 321-322 may enable accurate fuzzy matching of date representations from different parts of the world. In the particular embodiment illustrated in FIG. 3, the second comparison score 341 may be calculated to be 0.86.

A final comparison score 351 may be calculated as a maximum of the two comparison scores 331 and 341. For example, in the particular embodiment illustrated in FIG. 3, the final comparison score 351 of the first cleaned value "2009/12/09," at 321, and the second cleaned value "2010/09/21," at 322, is 0.86. The final comparison score 351 of 0.86 may represent a degree of correlation between the two cleaned values 321-322. In a particular embodiment, when the final comparison score is less than a threshold, fuzzy matching logic operating in accordance with the method 300 of FIG. 3 may output an indication that the compared values are dissimilar. Alternately, if the final comparison score is greater than or equal to a threshold, the fuzzy matching logic may output an indication that the compared values are similar. For example, referring to FIG. 3, if the threshold is 0.95, the fuzzy matching logic may indicate that the first cleaned value 321 and the second cleaned value 322 are dissimilar.

It will be appreciated that the method 300 of FIG. 3 may determine whether or not two values are "fuzzy similar" in constant (e.g., O(1)) time. Thus, for two values in a bounded domain, the method 300 of FIG. 3 may determine whether or not the two values are "fuzzy similar" irrespective of the size of the bounded domain. In addition, because the method 300 of FIG. 3 has a reduced complexity (e.g., O(1)) than existing fuzzy matching algorithms (e.g., $O(N^2)$), the method 300 of FIG. 3 may be executed faster than existing fuzzy matching algorithms. It will also be appreciated that the method 300 of FIG. 3 may be implemented in hardware or software by a few memory accesses, comparisons, and arithmetic operations.

Figure 4:
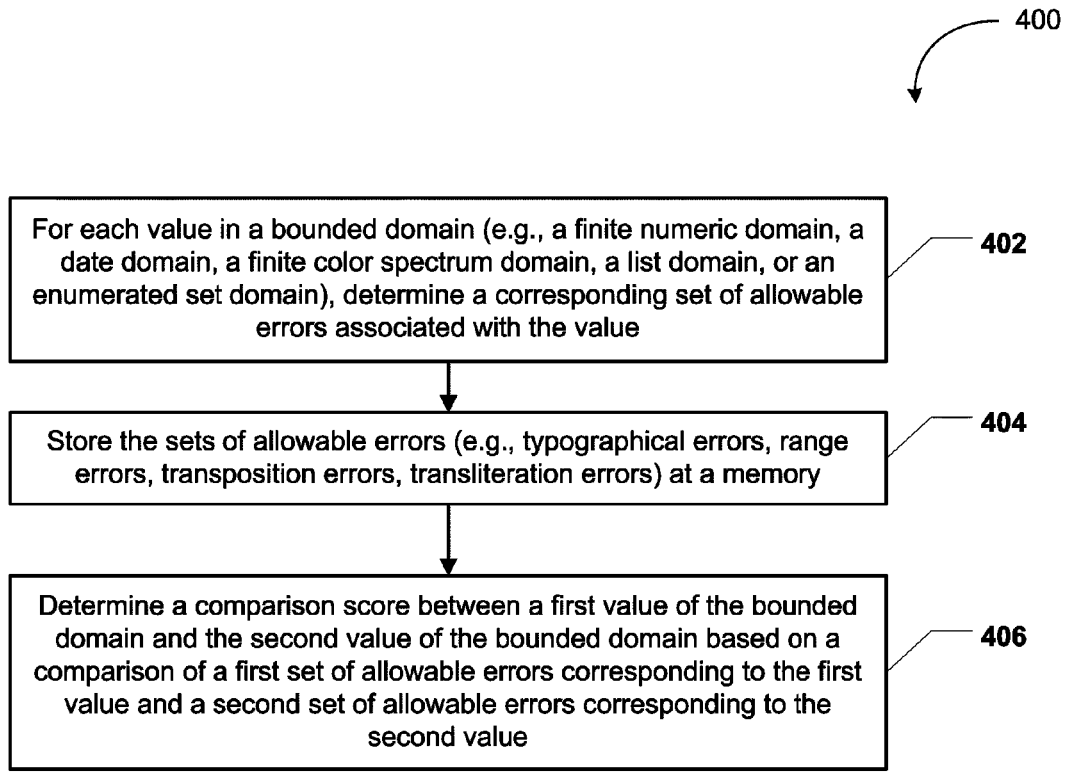
FIG. 4 is a flow diagram to illustrate a particular embodiment of a method of comparing values of a bounded domain.

FIG. 4 depicts a particular embodiment of a method 400 of comparing values of a bounded domain. For example, operation of the method 400 may be illustrated with reference to FIGS. 2-3.

The method 400 includes, for each value in a bounded domain, determining a corresponding set of allowable errors associated with the value, at 402. For example, in FIG. 2, the set 202 of allowable errors may be determined for the value 201. The method 400 also includes storing the sets of allowable errors at a memory, at 404. For example, in FIG. 2, the set 202 of allowable errors may be stored at a memory.

The method 400 further includes determining a comparison score between a first value of the bounded domain and a second value of the bounded domain, at 406. The comparison score is determined based on a comparison of a first set of allowable errors corresponding to the first value and a second set of allowable errors corresponding to the second value. For example, each of the day, month, and year similarity scores described with reference to FIG. 3 may be determined. As another example, the comparison scores 331, 341 may be determined by performing the method 400 of FIG. 4 three times (e.g., once with respect to days, once with respect to months, and once with respect to years). Thus, the method 400 of FIG. 4 may be recursively executed to perform fuzzy matching on composite values having sub-values that are members of bounded domains.

Figure 5:
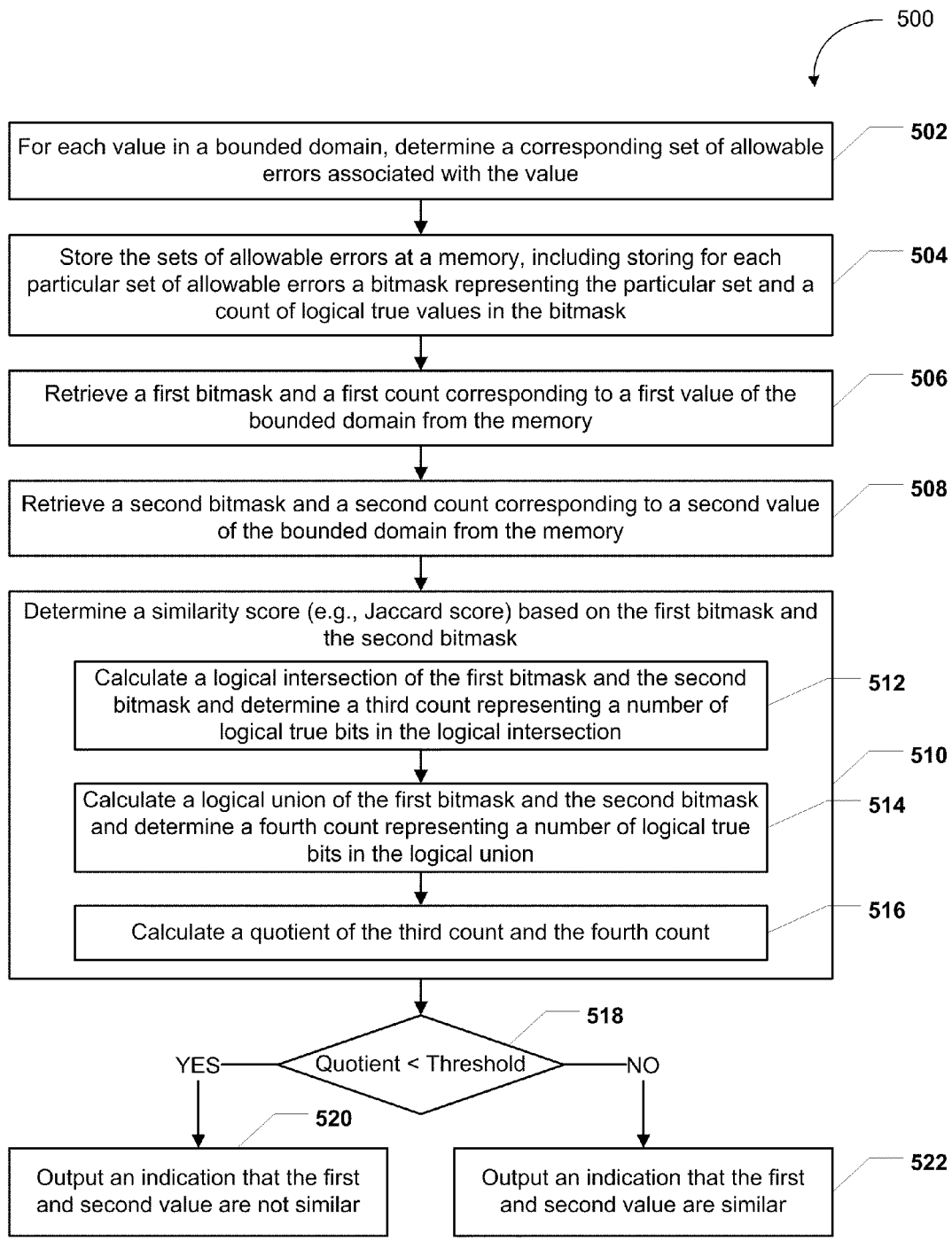
FIG. 5 is a flow diagram to illustrate another particular embodiment of a method of comparing of a bounded domain.

FIG. 5 depicts another particular embodiment of a method 500 of comparing values of a bounded domain. For example, operation of the method 500 may be illustrated with reference to FIGS. 2-3.

The method 500 includes, for each value in a bounded domain, determining a corresponding set of allowable errors associated with the value, at 502. For example, in FIG. 2, the set 202 of allowable errors may be determined (e.g., pre-computed) for the value 201. The method 500 also includes storing the sets of allowable errors at a memory, at 504. Storing a particular set of allowable errors may include storing a bitmask representing the particular set and a count of logical true values in the bitmask. For example, in FIG. 2, the bitmask 204 and the count 205 may be stored. In a particular embodiment, the bitmask 204 is stored as the unsigned 32-bit integer value 206.

The method 500 further includes retrieving a first bitmask and a first count corresponding to a first value of the bounded domain from the memory, at 506, and retrieving a second bitmask and a second count corresponding to a second value of the bounded domain from the memory, at 508. For example, referring to FIG. 3, a first bitmask and a first count corresponding to the first cleaned value 321 and a second bitmask and a second count corresponding to the second cleaned value 322 may be retrieved.

The method 500 includes determining a similarity score based on the first bitmask and the second bitmask, at 510. In a particular embodiment, the similarity score is a Jaccard score. Determining the Jaccard score includes calculating a logical intersection of the first bitmask and the second bitmask and determining a third count representing a number of logical true bits in the logical intersection, at 512. For example, referring to FIG. 3, a count (e.g., 8) of true bits may be determined with respect to a logical intersection of bitmasks for the year "2009" and the year "2010." Determining the Jaccard score also includes calculating a logical union of the first bitmask and the second bitmask and determining a fourth count representing a number of logical true bits in the logical union, at 514. For example, referring to FIG. 3, a count (e.g., 10) of true bits may be determined with respect to a logical union of bitmasks for the year "2009" and the year "2010." Determining the Jaccard score further includes calculating a quotient of the third count and the fourth count, at 516. For example, referring to FIG. 3, the year similarity Jaccard score of 0.8 may be calculated. It should be noted that calculation of a Jaccard score may also be illustrated with reference to day similarity scores or month similarity scores, as illustrated in FIG. 3.

The method 500 includes determining whether the quotient is less than a similarity threshold, at 518. When the quotient is less than the similarity threshold, the method 500 includes outputting an indication that the first value and the second value are not similar, at 520. When the quotient is greater than the similarity threshold, the method 500 includes outputting an indication that the first value and the second value are similar, at 522. In a particular embodiment, the indication is useable by a database system to consolidate two duplicate database records. For example, the method 500 of FIG. 5 may be performed by a fuzzy matching function that is called by a "RemoveDuplicateRecords" stored procedure at the database system.

Figure 6:
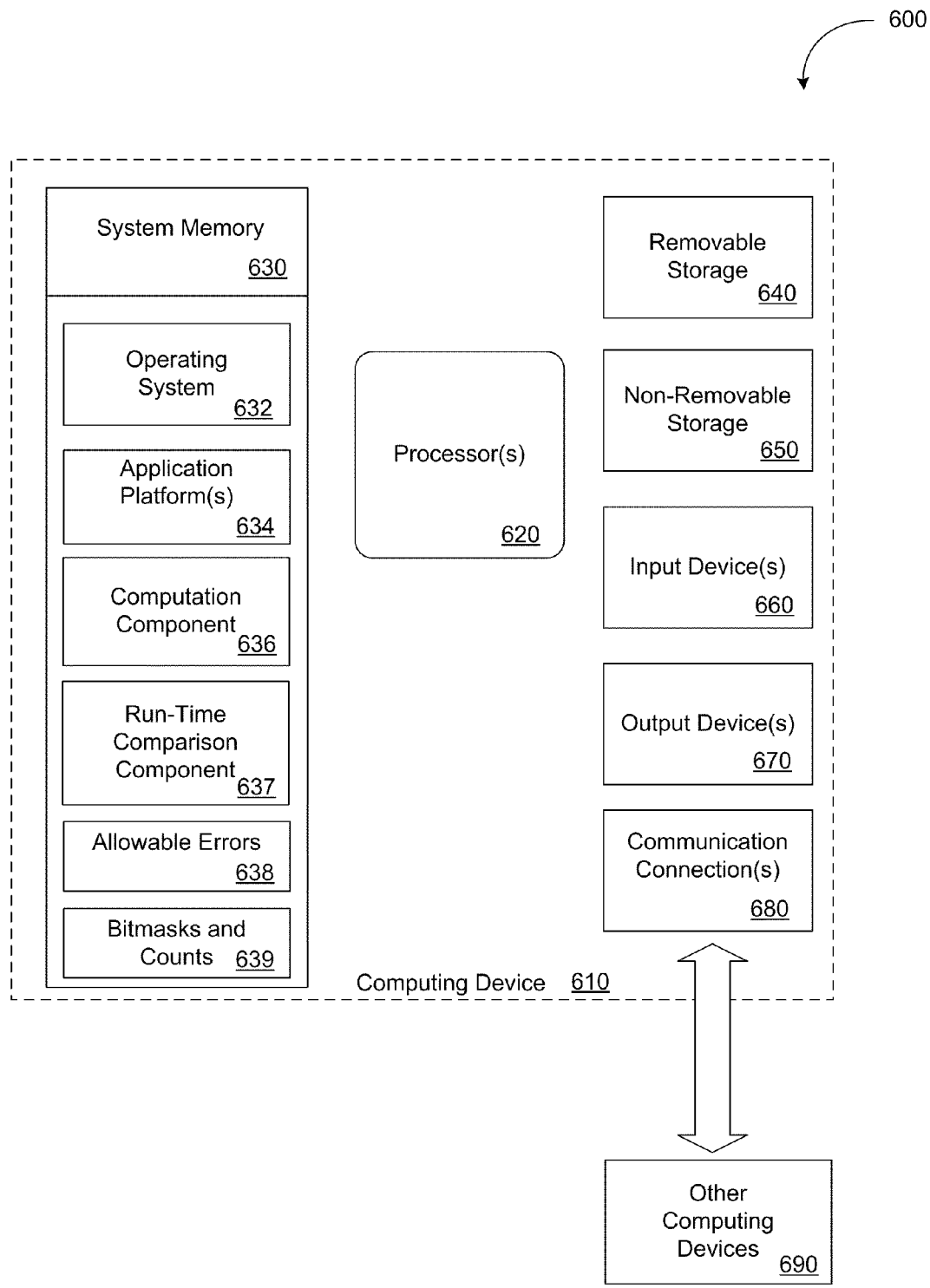
FIG. 6 is a block diagram of a computing environment including a computing device operable to support embodiments of computer-implemented methods, computer program products, and system components as illustrated in FIGS. 1-5.

FIG. 6 depicts a block diagram of a computing environment 600 including a computing device 610 operable to support embodiments of computer-implemented methods, computer program products, and system components according to the present disclosure. In an illustrative embodiment, the computing device 610 may implement one or more of the method 400 of FIG. 4 and the method 500 of FIG. 5. In another illustrative embodiment, the computing device 610 may determine and store the set 202 of FIG. 2, the bitmask 204 of FIG. 2, the count 205 of FIG. 2, the unsigned 32-bit integer 206 of FIG. 2, the values 301, 302, 321, and 322 of FIG. 3, and the scores 331, 341, and 351 of FIG. 3, or representations thereof.

The computing device 610 includes at least one processor 620 and a system memory 630. Depending on the configuration and type of computing device, the system memory 630 may be volatile (such as random access memory or "RAM"), non-volatile (such as read-only memory or "ROM," flash memory, and similar memory devices that maintain stored data even when power is not provided), or some combination of the two. The system memory 630 typically includes an operating system 632, one or more application platforms 634, one or more applications, and program data. For example, the system memory 630 may include fuzzy logic that includes a computation component 636 and a run-time comparison component 637. The computation component 636 may determine and store (e.g., prior to run-time at the computing device 610) sets of allowable errors 638 for each value in a bounded domain. The run-time comparison component 637 may determine (e.g., during run-time at the computing device 610) a comparison score between two values in the bounded domain based on sets of allowable errors 638 corresponding to the two values. For example, the comparison score may be a Jaccard score. In a particular embodiment, storing the sets of allowable errors 638 includes storing bitmasks and counts 639 that are representative of the sets of allowable errors 638. The bitmasks and counts 639 may include a particular bitmask and particular count (e.g., a number of logical true bits in the particular bitmask) for each particular set in the sets of allowable errors 638.

The computing device 610 may also have additional features or functionality. For example, the computing device 610 may also include removable and/or non-removable additional data storage devices such as magnetic disks, optical disks, tape, and standard-sized or flash memory cards. Such additional storage is illustrated in FIG. 6 by removable storage 640 and non-removable storage 650. Computer storage media may include volatile and/or non-volatile storage and removable and/or non-removable media implemented in any technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 610. Any such computer storage media may be part of the computing device 610.

The computing device 610 may also have input device(s) 660, such as a keyboard, mouse, pen, voice input device, touch input device, etc. Output device(s) 670, such as a display, speakers, printer, etc. may also be included. The computing device 610 also contains one or more communication connections 680 that allow the computing device 610 to communicate with other computing devices 690 over a wired or a wireless network.

It will be appreciated that not all of the components or devices illustrated in FIG. 6 or otherwise described in the previous paragraphs are necessary to support embodiments as herein described. For example, the removable storage 640 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
   for each value in a bounded domain, determining a corresponding set of allowable errors associated with the value;
   storing the sets of allowable errors at a memory; and
   determining a comparison score between a first value of the bounded domain and a second value of the bounded domain based on a comparison of a first set of allowable errors corresponding to the first value and a second set of allowable errors corresponding to the second value.

2. The computer-implemented method of claim 1, wherein the corresponding set of allowable errors includes a typographical error, a range error, a transposition error, a transliteration error, or any combination thereof.

3. The computer-implemented method of claim 1, wherein the bounded domain is one of a finite numeric domain, a date domain, a finite color spectrum domain, a list domain, and an enumerated set domain.

4. The computer-implemented method of claim 1, wherein each allowable error in a particular set of allowable errors is within the bounded domain.

5. The computer-implemented method of claim 1, wherein storing a particular set of allowable errors comprises storing a bitmask that is representative of the particular set at the memory.

6. The computer-implemented method of claim 1, wherein the bitmask is represented by one of a 32-bit unsigned integer, a 64-bit unsigned integer, a 128-bit unsigned integer, and a globally unique identifier (GUID).

7. The computer-implemented method of claim 6, wherein storing the particular set of allowable errors further comprises storing a count of logical true bits of the bitmask at the memory.

8. The computer-implemented method of claim 7, wherein determining the comparison score comprises:
   retrieving a first bitmask and a first count corresponding to the first value from the memory;
   retrieving a second bitmask and a second count corresponding to the second value from the memory; and
   determining a similarity score based on the first bitmask and the second bitmask.

9. The computer-implemented method of claim 8, wherein determining the similarity score based on the first bitmask and the second bitmask comprises:
   calculating a logical intersection of the first bitmask and the second bitmask;
   determining a third count representative of a number of logical true bits of the logical intersection;

calculating a logical union of the first bitmask and the second bitmask;

determining a fourth count representative of a number of logical true bits of the logical union; and calculating a quotient of the third count and the fourth count.

10. The computer-implemented method of claim 9, wherein determining the fourth count comprises subtracting the third count from a sum of the first count and the second count.

11. The computer-implemented method of claim 1, wherein the memory comprises random access memory (RAM) at a computer system, disk-based storage at a computer system, or any combination thereof.

12. The computer-implemented method of claim 11, wherein the comparison score is determined during a run-time of the computer system and wherein the sets of allowable errors are stored prior to the run-time of the computer system.

13. The computer-implemented method of claim 1, wherein the sets of allowable errors are stored as one of constants at a software program and immutable data.

14. The computer-implemented method of claim 1, further comprising separating a particular value of the bounded domain into a plurality of ngrams and determining a corresponding set of allowable errors for each of the plurality of ngrams.

15. The computer-implemented method of claim 1, wherein the sets of allowable errors are computed in linear time with respect to a size of the bounded domain and wherein the comparison score is computed in constant time with respect to the size of the bounded domain.

16. The computer-implemented method of claim 1, further comprising:

when the comparison score is less than a similarity threshold, outputting an indication that the first value and the second value are dissimilar; and when the comparison score is greater than or equal to the similarity threshold, outputting an indication that the first value and the second value are similar.

17. A computer system, comprising:

a processor; and a memory coupled to the processor, the memory storing instructions, that when executed by the processor, cause execution of fuzzy matching logic comprising:

a computation component configured to, for each of a plurality of values in a bounded domain:

determine a set of allowable errors for the value; and store the set of allowable errors at the memory; and a run-time comparison component configured to determine a comparison score between a first value and a second value in the bounded domain based on a first set of allowable errors corresponding to the first value and a second set of allowable errors corresponding to the second value.

18. The computer system of claim 17, wherein the fuzzy matching logic is integrated into a user interface, a word processing application, a spreadsheet application, a database application, a dynamically linked library (DLL), or any combination thereof.

19. A computer-readable medium comprising instructions, that when executed by a computer, cause the computer to:

for each value in a bounded domain, determine a corresponding set of allowable errors associated with the value;

performing a hashing operation on the sets of allowable errors, wherein performing the hashing operation on a particular set of allowable errors results in a bitmask that is representative of the particular set and a count of logical true bits of the bitmask;

store the bitmasks and counts in a statically allocated portion of memory;

receive a first value within the bounded domain and a second value within the bounded domain;

retrieve a first bitmask and a first count corresponding to the first value and a second bitmask and a second count corresponding to the second value from the memory; and determine a Jaccard score of the first bitmask and the second bitmask.

20. The computer-readable medium of claim 19, wherein the bounded domain is an ordered domain.

* * * * *